United States Patent
Zemach et al.

(10) Patent No.: US 12,401,729 B1
(45) Date of Patent: Aug. 26, 2025

(54) INTERNAL COMMUNICATIONS WITHIN A NETWORK DEVICE

(71) Applicant: Marvell Israel (M.I.S.L) Ltd., Yokneam (IL)

(72) Inventors: Rami Zemach, Givat Shapira (IL); Jacob Jul Schroder, Kongens Lyngby (DK)

(73) Assignee: Marvell Asia Pte Ltd, Singapore (SG)

( * ) Notice: Subject to any disclaimer, the term of this patent is extended or adjusted under 35 U.S.C. 154(b) by 658 days.

(21) Appl. No.: 17/584,000

(22) Filed: Jan. 25, 2022

Related U.S. Application Data

(60) Provisional application No. 63/141,452, filed on Jan. 25, 2021.

(51) Int. Cl.
*H04L 69/22* (2022.01)
*H04L 45/74* (2022.01)
*H04L 47/62* (2022.01)

(52) U.S. Cl.
CPC ............. *H04L 69/22* (2013.01); *H04L 45/74* (2013.01); *H04L 47/62* (2013.01)

(58) Field of Classification Search
CPC .......... H04L 69/22; H04L 45/74; H04L 47/62
See application file for complete search history.

(56) References Cited

U.S. PATENT DOCUMENTS

| | | | |
|---|---|---|---|
| 10,200,313 B2 | 2/2019 | Zemach et al. | |
| 10,764,410 B2 | 9/2020 | Arad et al. | |
| 11,159,440 B2 | 10/2021 | Navon et al. | |
| 2009/0100496 A1* | 4/2009 | Bechtolsheim | H04N 7/17336 725/147 |
| 2010/0272117 A1* | 10/2010 | Wu | H04L 49/252 370/413 |
| 2013/0139002 A1* | 5/2013 | Huang | G06F 11/3656 714/E11.178 |
| 2013/0259063 A1* | 10/2013 | Thottan | H04L 49/9005 370/419 |
| 2015/0169405 A1* | 6/2015 | Frickey, III | G06F 11/1076 714/766 |
| 2017/0353403 A1* | 12/2017 | Zemach | H04L 49/9042 |
| 2020/0356486 A1* | 11/2020 | Sharma | G06F 12/084 |
| 2021/0160353 A1* | 5/2021 | Qu | H04L 67/1097 |

* cited by examiner

*Primary Examiner* — Sun Jong Kim

(57) ABSTRACT

A network device forwards packets among a plurality of ports based on forwarding decisions made by a packet processor. Forwarding the packets among the plurality of ports comprises storing at least payloads of the packets in a packet memory until the packets are transmitted by the network device. Additionally, the network device communicates non-packet data within the network device, including accessing the packet memory to write the non-packet data to the packet memory, and accessing the packet memory to read the non-packet data from the packet memory. The non-packet data includes information not included in any packets received or transmitted by the network device, and for which the packet processor makes a forwarding decision.

20 Claims, 5 Drawing Sheets

Forwarding packets among a plurality of ports of a network device, including storing at least payloads of the packets in a packet memory coupled to the plurality of ports until the packets are transmitted by the network device via ports of the network device 504

↓

Communicating non-packet data within the network device, including writing the non-packet data to the packet memory, and reading the non-packet data from the memory. 508

INTERNAL COMMUNICATIONS WITHIN A NETWORK DEVICE

CROSS REFERENCES TO RELATED APPLICATIONS

This application claims the benefit of U.S. Provisional Patent Application No. 63/141,452, entitled "Packet Switching for Internal Messaging," filed on Jan. 25, 2021, which is incorporated herein by reference in its entirety for all purposes.

FIELD OF TECHNOLOGY

The present disclosure relates generally to network communications, and more particularly to conveying information within a network device.

BACKGROUND

Network devices such as switches, routers, etc., typically include a packet buffer to store received packets while the network device determines ports of the network device via which the packets are to be transmitted and performs other packet processing operations on received packets. Network device also include other components such as a central processing unit (CPU), a packet processor, queues for storing packet descriptors, etc., and such other components typically need to communicate information with other components within the network device. Thus, typical network devices include internal communication interconnection networks (e.g., busses, crossbars, etc.) for routing internally used information amongst components within the network device. Such internal interconnection networks within network devices typically consume a significant amount of integrated circuit (IC) chip area and thus are responsible for a substantial portion of the cost of IC chips of network devices. Additionally, such internal interconnection networks are responsible for a substantial portion of the power consumed by IC chips of network devices.

SUMMARY

In an embodiment, a network device comprises: a plurality of ports configured to communicatively couple to a plurality of communication links; a packet processor configured to process at least headers of packets received via ports of the network device to make forwarding decisions regarding the packets; a packet memory coupled to the plurality of ports, the packet memory configured to store at least payloads of packets received via ports of the network device until the packets are transmitted by the network device via ports of the network device; a plurality of crossbars coupled to the packet memory, each crossbar configured to provide to a respective set of ports of the network device read access and write access to the packet memory; and a plurality of non-port components associated with processing packets received by the network device, the plurality of non-port components coupled to the plurality of crossbars, each non-port component being configured to send non-packet data to one or more of i) at least one port and ii) at least one other non-port component, by storing non-packet data in the packet memory for retrieval by the one or more of i) the at least one port and ii) the at least one other non-port component, the non-packet data comprising information not included in any packet i) received or transmitted by the network device and ii) for which the packet processor makes a forwarding decision.

In another embodiment, a method for communicating information within a network device includes: forwarding packets among a plurality of ports of the network device based on forwarding decisions made by a packet processor of the network device, the packets having been received via communication links coupled to the plurality of ports and subsequently transmitted by the network device via the plurality of ports, wherein forwarding the packets among the plurality of ports comprises storing at least payloads of the packets in a packet memory coupled to the plurality of ports until the packets are transmitted by the network device via ports of the network device, including i) accessing the packet memory via a plurality of crossbars coupled to the packet memory to write the packets to the packet memory, and ii) accessing the packet memory via the plurality of crossbars to read the packets from the packet memory; and communicating non-packet data within the network device, including i) accessing the packet memory via the plurality of crossbars to write the non-packet data to the packet memory, and ii) accessing the packet memory via the plurality of crossbars to read the non-packet data from the packet memory, the non-packet data comprising information not included in any packets i) received or transmitted by the network device and ii) for which the packet processor makes a forwarding decision.

BRIEF DESCRIPTION OF THE DRAWINGS

FIG. 5 is a flow diagram of an example method for communicating non-packet information within a network device using a packet memory of the network device, according to an embodiment.

DETAILED DESCRIPTION

In embodiments described below, a network device includes a packet memory for storing received packets while the network device determines ports of the network device via which the packets are to be transmitted. In some embodiments, the size and/or access rate of the packet memory is designed to handle relatively infrequent events, such as bursts of packets (i.e., a high number of packets received in a short amount of time), relatively long packets, etc. As a result, the packet memory often has excess capacity during operation, e.g., bandwidth availability when a rate at which the packet memory is being accessed to store packets to the packet memory and read packets from the packet memory is below peak levels, an amount of memory space not currently being used for storing packets, etc.

In embodiments described below, other components of the network device, such as a central processing unit (CPU), a packet processor, queues for storing packet descriptors, etc., utilize the excess capacity of the packet memory to communicate non-packet information to other components within the network device. As used herein, the term "non-packet information" refers to data that is not included any network packet i) that is received or transmitted by the network device and ii) for which the packet processor makes a forwarding decision. As used herein, the term "network packet" refers to a formatted unit of data (a "packet") that includes one or more headers having network information that network devices use to route the packet through a communication network.

As an illustrative example, the packet memory is configured to store queues corresponding to respective pairs of components within the network device, and the respective pairs of components utilize the queues to communicate non-packet information. By using queues within the packet memory for communicating non-packet information within the network device, integrated circuit (IC) chip area devoted to internal communication interconnection networks (e.g., busses, crossbars, etc.) for communicating such non-packet information amongst components within the network device is reduced as compared to typical network devices, according to some embodiments. Because such internal interconnection networks are reduced as compared to typical network devices, power consumption is also reduced as compared to typical network devices, at least in some embodiments.

Figure 1:
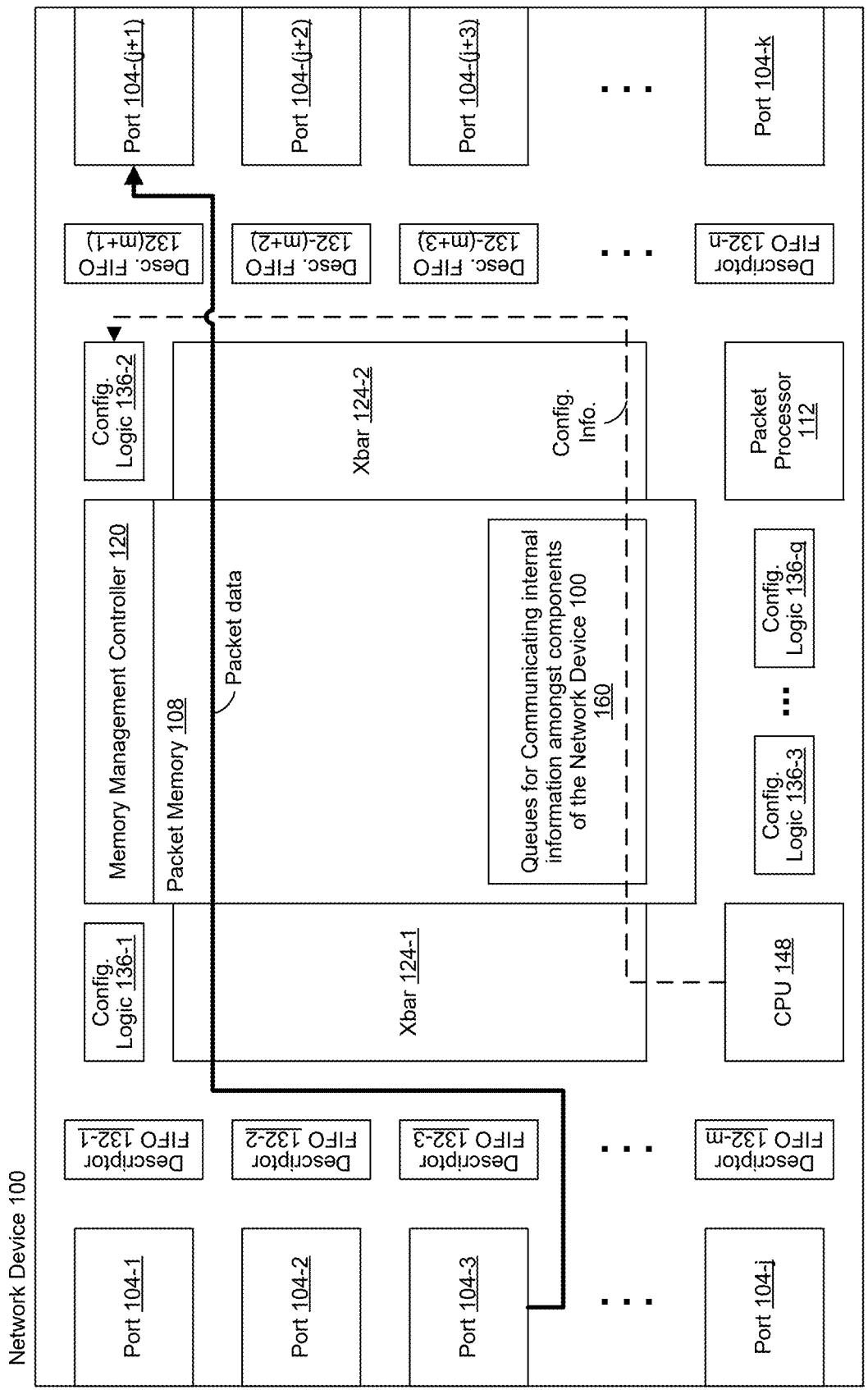
FIG. 1 is a simplified diagram of an example network device in which non-packet data is communicated within the network device via a packet memory of the network device, according to an embodiment.

FIG. 1 is a simplified diagram of an example network device 100, according to an embodiment. The network device 100 includes a plurality of ports 104, a packet memory 108, and a packet processor 112. At least some of the ports 104 are configured to communicatively couple to respective communication links. Packets received via communication links coupled to ports 104 are temporarily stored in the packet memory 108 while the packet processor 112 processes at least headers of the packets to determine ports 104 via which the packets are to be transmitted.

Components of the network device 100, such as the ports 104 and other components to be described below, access the packet memory 108 via a memory management controller 120 and one or more crossbars 124. Although two crossbars 124 are illustrated in FIG. 1, the network device 100 includes any suitable number of crossbars 124, such as one, three, four, five, etc., in various embodiments. Generally, respective sets of components of the network device 100 access the packet memory 108 via respective crossbars 124, in some embodiments.

In some embodiments, the packet memory 108 is a part of a larger memory device that stores information used by the network device 100 in addition to the information stored in the packet memory 108. Examples of information stored in the larger memory device in addition to the information stored in the packet memory 108 are described below. In other embodiments, the packet memory 108 corresponds to a first memory device, and information used by the network device 100 in addition to the packet memory 108 is stored in one or more second memory devices that are distinct from the first memory device. In some embodiments, the packet memory 108 corresponds to multiple memory devices.

In some embodiments, the size and/or access rate of the packet memory 108 is designed to handle relatively infrequent events, such as bursts of packets (i.e., a high number of packets received in a short amount of time), receipt of relatively long packets, etc. As a result, the packet memory 108 often has excess capacity during operation, e.g., an amount of memory space not currently being used for storing packets, access availability when the packet memory 108 is not being accessed to store packets to the packet memory 108 or read packets from the packet memory 108, etc.

When a packet is received via one of the ports 104, the memory management controller 120 allocates memory resources in the packet memory 108 for storing the packet. Additionally, the memory management controller 120 generates a packet descriptor corresponding to the packet, and provides the packet descriptor to the packet processor 112 for processing by the packet processor 112. Packet descriptors and processing of packet descriptors by the packet processor 112 will be discussed in more detail below.

A received packet (or at least a data portion of the receive packet) is routed from the port 104 at which the packet was received to the packet memory 108 via a crossbar 124 that is coupled to the port 104, and the packet is stored in the packet memory 108 using memory resources allocated by the memory management controller 120.

In an embodiment, the packet memory 108 is organized as a plurality of buffers of one or more fixed lengths, and the memory management controller 120 allocates linked lists of buffers for storage of packet data. For example, in connection with a packet being received at one of the ports 104, the memory management controller 120 allocates a linked list of buffers within the packet memory 108 for storing the received packet. In other embodiments, the packet memory 108 is organized in another suitable manner and the memory management controller 120 allocates memory space in the packet memory 108 for storage of packet data in another suitable manner.

As discussed above, the memory management controller 120 generates packet descriptors corresponding to respective received packets. The packet descriptor includes header information extracted from the packet by the memory management controller 120, such as Layer-2 header information, Layer-3 header information, tunnelling header information, etc. The packet descriptor also includes information that is associated with the packet but that is not included within any headers of the packet when the packet is received by the network device 100 and is not included within any headers of the packet when the packet is transmitted by the network device 100 (referred to herein as "associated packet information"). Examples of associated packet information that may be included in the packet descriptor by the memory management controller 120 include an indication of a location in the packet memory 108 at which the packet is stored, an identifier (ID) of the port 104 via which the packet was received ("source port ID"), an indicator of a time at which the packet was received by the network device 100 ("receive time indicator"), etc. Additionally, the packet processor 112, when processing the packet descriptor, may add associated packet information to the packet descriptor such as an indicator of one or more ports 104 via which the packet is to be transmitted ("target ports"), an indicator of a priority level according to which the packet is to be transmitted by the target port(s), an indicator of whether the packet is to be dropped, an indicator of whether a tunneling header is to be added to the packet, an indicator of whether a tunneling header is to be removed from the packet, an indicator of whether a timestamp is to be added to the packet prior to transmitting the packet, etc.

In some embodiments, the packet processor 112 comprises a Layer-2 bridge engine configured to process at least Layer-2 headers (e.g., media access control (MAC) headers)

of packets received via the ports 104 to determine ports 104 via which the packets are to be transmitted. In embodiments in which the packet processor 112 comprises a Layer-2 bridge engine, the Layer-2 bridge engine uses at least Layer-2 header information in a packet descriptor to determine one or more target ports via which a packet corresponding to the packet descriptor is to be transmitted and stores indicator(s) of the determined target ports in the packet descriptor. In some embodiments in which the packet processor 112 comprises a Layer-2 bridge engine, the Layer-2 bridge engine utilizes a forwarding table that stores associations between i) at least Layer-2 information (e.g., destination MAC addresses, VLAN identifiers (VIDs), etc.) and ii) ports 104 to determine one or more target ports via which a packet corresponding to the packet descriptor is to be transmitted. In some embodiments, the forwarding table is stored in one or more memory devices that are distinct from one or more other memory devices corresponding to the packet memory 108. In other embodiments, the forwarding table is stored in one or more memory devices corresponding to the packet memory 108.

In some embodiments, the packet processor 112 additionally or alternatively comprises a Layer-3 routing engine configured to process at least Layer-3 headers (e.g., Internet Protocol (IP) headers) of packets received via the ports 104 to determine ports 104 via which the packets are to be transmitted. In embodiments in which the packet processor 112 comprises a Layer-3 routing engine, the Layer-3 routing engine uses IP header information in a packet descriptor to determine a next hop IP address to be included in a packet corresponding to the packet descriptor, and determines one or more target ports via which the packet is to be transmitted. Additionally, the Layer 3 routing engine stores the next hop IP address and indicator(s) of the determined target ports in the packet descriptor. In some embodiments in which the packet processor 112 comprises a Layer-3 routing engine, the Layer-3 routing engine utilizes a forwarding table that stores Layer-3 forwarding information and associations with ports 104 to determine a next hop IP address and one or more target ports via which a packet corresponding to the packet descriptor is to be transmitted. In some embodiments, the forwarding table is stored in one or more memory devices that are distinct from one or more other memory devices corresponding to the packet memory 108. In other embodiments, the forwarding table is stored in one or more memory devices corresponding to the packet memory 108.

When the packet processor 112 completes processing of a packet descriptor, the packet descriptor is stored in one or more first-in, first-out (FIFO) buffers 132 (descriptor FIFOs 132) corresponding to one or target ports 104 that the packet processor 112 determined and via which the packet is to be transmitted. In connection with a packet descriptor reaching a head of a descriptor FIFO 132, the port 104 that corresponds to the descriptor FIFO 132 uses information stored in the packet descriptor (e.g., an indication of a location in the packet memory 108 at which a packet corresponding to the packet descriptor is stored) to retrieve the packet, and transmits the packet via the communication link coupled to the port 104. Each port 104 retrieves packets from the packet memory 108 via a crossbar 124 that is coupled to the port 104.

FIG. 1 illustrates, as an example, packet data (e.g., at least a payload of a packet) that was received at port 104-3 being stored in the packet memory 108, and the packet data subsequently being read out from the packet memory 108 and provided to the port 104-(*j*+1) for transmission.

When a packet is retrieved from the packet memory 108 for transmission, the memory management controller 120 subsequently designates the memory resources that had been used for storing the packet as "unused", i.e., the memory management controller 120 returns the memory resources to a pool of unused memory resources that are available for allocation for storing newly received packets or other information, for example.

In some embodiments, a FIFO buffer 132 is expanded into an external memory (not shown) when the FIFO buffer 132 experiences congestion (e.g., a rate at which packet descriptors are stored to the FIFO buffer 132 significantly exceeds a rate at which packet descriptors are removed from the FIFO buffer 132, causing the FIFO buffer 132 to grow in size). In some embodiments, the external memory (not shown) is coupled to one of the ports 104, and packet descriptors in the FIFO buffer 132 that is experiencing congestion are transferred from the FIFO buffer 132 to the one port 104 for transfer to and temporary storage in the external memory. When packet descriptors in the external memory are nearing a head of the FIFO buffer 132, the packet descriptors are retrieved from the external memory and provided to the one port 104, and then transferred from the one port 104 back to the FIFO buffer 132.

The network device 100 also includes configuration logic blocks 136 that control operation of various components of the network device 100. As an illustrative example, respective configuration logic blocks 136 correspond to each of at least some of the ports 104, each such configuration logic block 136 controlling operation of the respective port 104, according to an embodiment. For example, the configuration logic block 136 for a respective port 104 controls one or more of (or none of): i) whether the port 104 is to timestamp packets being transmitted by the port, ii) whether the port 104 is to timestamp packets received by the port, iii) whether the port 104 is to count bytes being transmitted by the port, iv) whether the port 104 is to count bytes received by the port, v) a transmit/receive rate at which the port is to operate, vi) a protocol the port is to use, vi) an error correction code the port is to use, etc. As another illustrative example, one or more configuration logic blocks 136 correspond to the packet processor 112 and control operation of the packet processor 112.

Each of at least some of the configuration logic blocks 136 includes respective memory (not shown) that stores configuration information used by the configuration logic block 136 to control operation of a respective component of the network device 100.

The network device 100 also includes a central processing unit (CPU) 148 that manages operation of the network device 100, according to an embodiment. The CPU 148 includes, or is coupled to, a memory (not shown) that stores machine readable instructions (e.g., software, firmware, etc.) that, when executed by the CPU 148, causes the CPU 148 to perform various acts associated with management of operation of the network device 100. For example, in some embodiments, the CPU 148 controls operation of various components of the network device 100 by generating respective configuration information and sending the respective configuration information to respective configuration logic blocks 136. In an embodiment, configuration information generated by the CPU 148 is stored in memories corresponding to the configuration logic blocks 136.

In some embodiments, the CPU 148 sends one or more of management information, status information, debugging information, etc., to an external CPU (not shown) coupled to one of the ports 104 or to a dedicated interface distinct from the ports 104.

In some embodiments, various components of the network device 100 send information to the CPU 148 that the CPU 148 uses to control and/or manage operation of the network device 100. Examples of information sent by components of the network device 100 to the CPU 148 include status information, management information, debugging information, etc., associated with operation of the components of the network device 100.

As discussed above, non-packet information that is internally used by the network device 100 (e.g., configuration data, status information, debugging information, associated packet information within packet descriptors (e.g., receive port IDs, indicators of target ports, locations of packets within the packet memory 108, etc.), etc.) are communicated amongst components of the network device 100.

As discussed above, typical network devices include internal communication interconnection networks (e.g., busses, crossbars, etc.) for routing such non-packet information amongst components within the network device. Such internal interconnection networks within network devices typically consume a substantial amount of integrated circuit (IC) chip area and/or are responsible for a substantial portion of the power consumed by IC chips of network devices.

As will be described further below, the network device 100 utilizes the packet memory 108 to communicate non-packet information among components of the network device 100. By using the packet memory 108, IC chip area dedicated to internal communication interconnection networks (e.g., busses, crossbars, etc.) for communicating such non-packet information amongst components of the network device 100 is reduced as compared to typical network devices, according to some embodiments.

The packet memory 108 stores queues 160 that are used for communicating non-packet information among components of the network device 100. In an embodiment, the CPU 148 and/or the memory management controller 120 (and/or another suitable component of the network device 100) configures the queues 160 for use by components of the network device 100 and informs the components of the network device 100 of the queues 160 that are to be used. For example, the CPU 148 and/or the memory management controller 120 (and/or another suitable component of the network device 100) sets up a particular queue 160 to be used by a first component to transfer non-packet information to a second component, and informs the first component and the second component of the particular queue 160 that they are to use.

In an embodiment in which the memory management controller 120 allocates linked lists of buffers, the queues 160 comprise linked lists of buffers. In such embodiments, when a queue 160, which comprises a linked list of buffers, is set up to permit a first component to transfer non-packet information to a second component, the memory management controller 120 informs the first component and the second component of an indicator(s) of the linked list. When the first component is to transfer non-packet information to the second component, the non-packet information is written to a head of the linked list; and the memory management controller 120 allocates a new buffer for the linked list and updates the head to point to the new buffer. Similarly, the second component retrieves from the tail of the linked list non-packet information that came from the first component; and the memory management controller 120 updates the tail to point to a next buffer in the linked list and deallocates the buffer that was previously the tail.

In some embodiments, when a linked list of buffers (a queue 160) is set up to permit a first component to transfer non-packet information to a second component, the memory management controller 120 informs the first component of an indicator of a head of the linked list, and informs the second component of an indicator of a tail of the linked list.

FIG. 1 illustrates (with a dashed line) the CPU 148 communicating configuration information to the configuration logic 136-2 via a queue 160 within the packet memory 108. The queue 160 being used by the CPU 148 and the configuration logic 136-2 was previously set up by the CPU 148 and/or the memory management controller 120 (and/or another suitable component of the network device 100), and the configuration logic 136-2 was previously informed of the queue 160 being used by the CPU 148 to send configuration information to the configuration logic 136-2. If the queue 160 was not set up by the CPU 148, another component informs the CPU 148 of the queue 160 that the CPU 148 is to use to send configuration information to the configuration logic 136-2.

The CPU 148 accesses the packet memory 108 via the crossbar 124-1 to write the configuration information to the queue 160. Similarly, the configuration logic 136-2 accesses the packet memory 108 via the crossbar 124-2 to read the configuration information from the queue 160.

Figure 2:
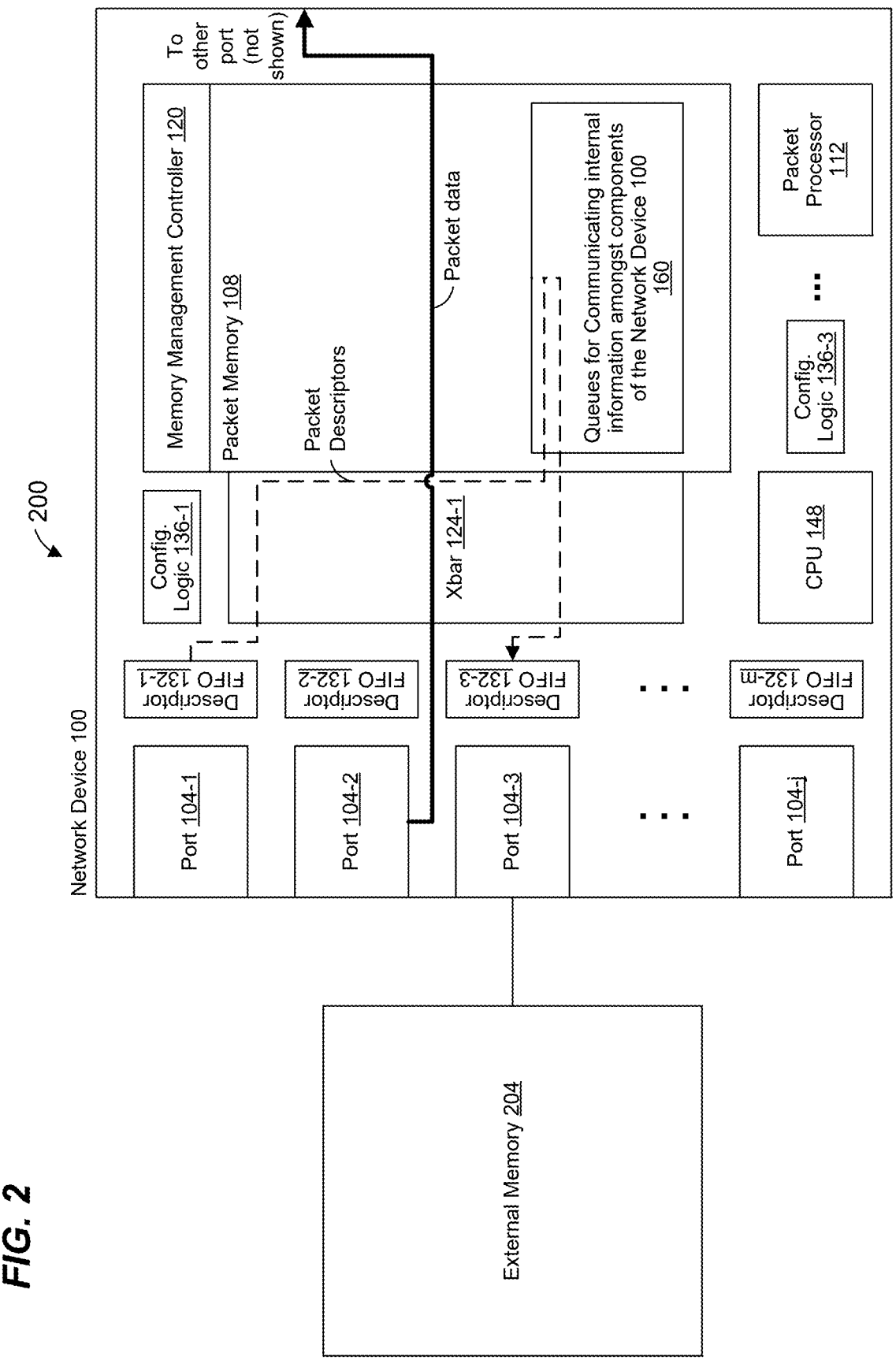
FIG. 2 is a simplified block diagram of an example system in which the network device of FIG. 1 uses a packet memory to communicate packet descriptors between components of the network device, according to an embodiment.

FIG. 2 is a simplified block diagram of an example system 200 comprising a network device that uses a packet memory to communicate packet descriptors between components of the network device, according to an embodiment. The system 200 includes the network device 100 of FIG. 1. Some components of the network device 100 of FIG. 1 are not shown in FIG. 2 merely to avoid obscuring relevant elements of the network device 100 discussed with reference to FIG. 2.

FIG. 2 illustrates, as an example, packet data (e.g., at least a payload of a packet) that was received at port 104-2 being stored in the packet memory 108, and the packet data subsequently being read out from the packet memory 108 and provided to another port (not shown) for transmission.

The system 200 includes a memory 204 that is external to the network device 100 ("external memory 204") and coupled to port 104-3 of the network device 100. The network device 100 is configured to write to and read from the external memory 204 via the port 104-3. In the embodiment illustrated in FIG. 2, the descriptor FIFO 132-1 has been expanded to store some packet descriptors in the external memory 204. Thus, some descriptors are removed from the descriptor FIFO 132-1 and are temporarily stored in the external memory 204 by way of the port 104-3.

In the embodiment illustrated in FIG. 2, the descriptor FIFO 132-3 corresponds to the port 104-3, and descriptors that are to be written to the external memory 204 via the port 104-3 are enqueued in the descriptor FIFO 132-3. Thus, in connection with transferring descriptors from the descriptor FIFO 132-1 to the external memory 204, the descriptors are temporarily stored in the descriptor FIFO 132-3.

FIG. 2 illustrates (with a dashed line) the descriptor FIFO 132-1 communicating packet descriptors to the descriptor FIFO 132-3 via a queue 160 within the packet memory 108. The queue 160 being used by the descriptor FIFO 132-1 and the descriptor FIFO 132-3 was previously set up by the CPU 148 and/or the memory management controller 120 (and/or another suitable component of the network device 100), and the descriptor FIFO 132-1 and the descriptor FIFO 132-3 were previously informed of the queue 160 being used by the descriptor FIFO 132-1 to send packet descriptors to the descriptor FIFO 132-3.

The descriptor FIFO 132-1 accesses the packet memory 108 via the crossbar 124-1 to write the packet descriptors to the queue 160. Similarly, the descriptor FIFO 132-2 accesses the packet memory 108 via the crossbar 124-1 to read the packet descriptors from the queue 160.

Referring now to FIGS. 1 and 2, in some embodiments in which the packet memory 108 is organized as a plurality of buffers having one or more fixed lengths, the fixed length(s) of the buffers are designed for writing and reading packet data at line speeds. In some embodiments, a fixed length of the buffers corresponds to a width of a read/write interface of the packet memory 108, which is designed for writing and reading packet data at line speeds. Thus, in some embodiments, the fixed length(s) of buffers of the packet memory 108 is relatively long as compared to lengths of units of non-packet information that are being communicated between components of the network device 100. Thus, in some embodiments, multiple units of non-packet information are aggregated by a first component of the network device to form a packaged set of non-packet information that is then stored within a buffer of the packet memory 108. When a second component of the network device (for which the non-packet information is intended) retrieves the packaged set of non-packet information from the buffer of the packet memory 108, the second component unpacks the individual units of non-packet information within the packaged set of non-packet information and uses the individual units of non-packet information.

Figure 3:
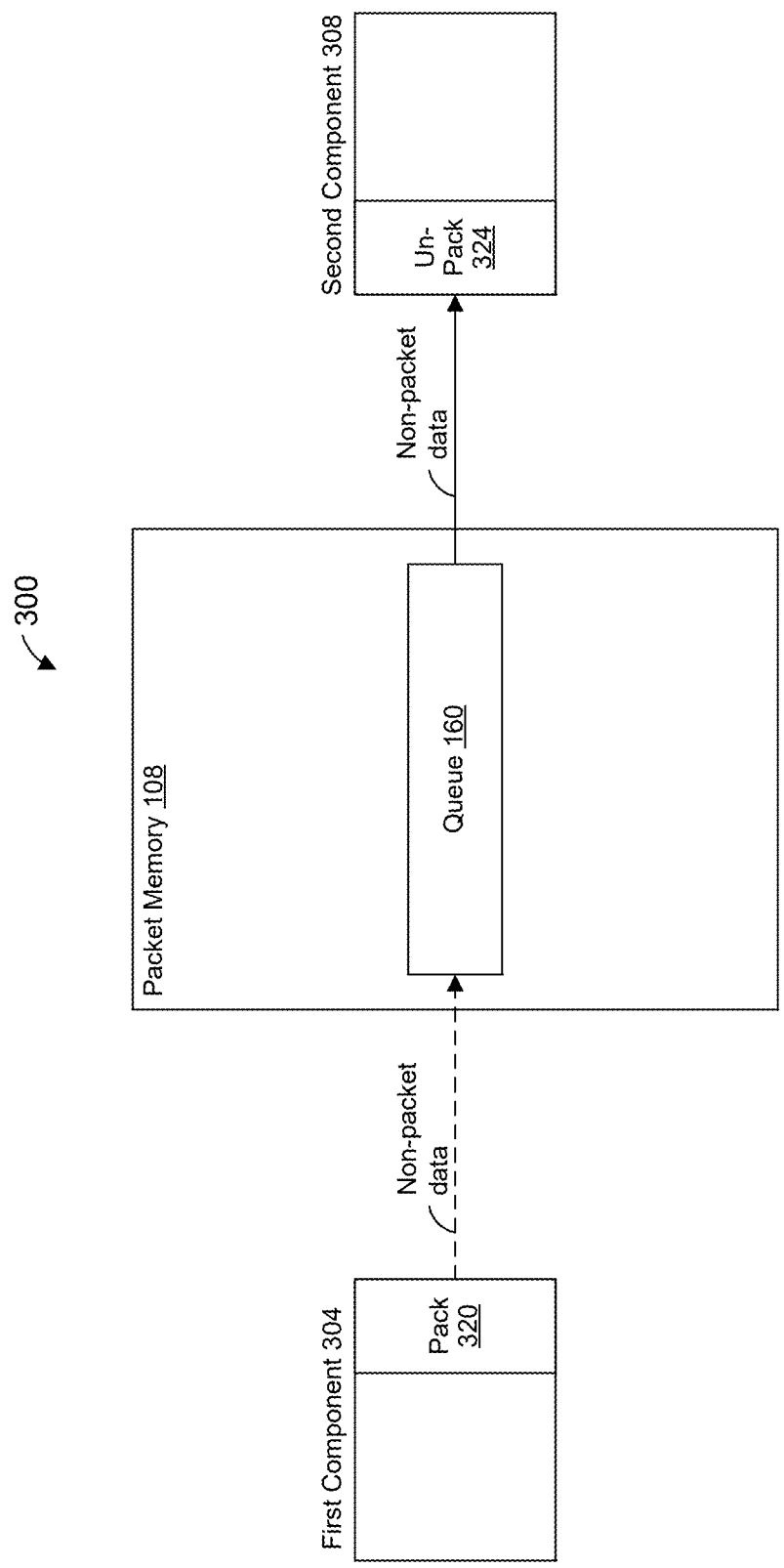
FIG. 3 is a simplified diagram of an example system within a network device for communicating non-packet information via a packet memory of the network device, according to an embodiment.

FIG. 3 is a simplified diagram of an example system 300 within a network device for communicating non-packet information via a packet memory of the network device, according to an embodiment. In an embodiment, the system 300 is included within the network device 100 of FIG. 1 and is described with reference to FIG. 1 for explanatory purposes. In other embodiments, the system 300 is included within a suitable network device 100 different than the network device 100 of FIG. 1. Other components of the network device are omitted from FIG. 3 merely to avoid obscuring relevant components of the network device described below. For example, the crossbar(s) 124 are not shown in FIG. 3.

The system 300 includes a first component 304 of the network device that transfers non-packet information of the network device to a second component 308 of the network device via a queue 160 included within the packet memory 108 of the network device. In some embodiments, the first component 304 accesses the packet memory 108 via a first crossbar 124 (not shown) and the second component 308 accesses the packet memory 108 via a second crossbar 124 (not shown). In other embodiments, the first component 304 and the second component 308 both access the packet memory 108 via a same crossbar 124 (not shown).

In some embodiments, the first component 304 is the CPU 148, and the second component 308 is another component of the network device 100, such as a descriptor FIFO 132, configuration logic 136, a port 104, an external CPU (not shown in FIG. 1) coupled to the network device 100, etc. In some embodiments, the second component 308 is the CPU 148, and the first component 304 is another component of the network device 100, such as a descriptor FIFO 132, configuration logic 136, a port 104, an external CPU, etc.

In various embodiments, the non-packet information transferred between the first component 304 and the second component 308 comprises management information, control information, configuration information, non-packet information within packet descriptors, etc.

In some embodiments, the first component 304 is a descriptor FIFO 132, and the second component 308 is another component of the network device 100, such as another descriptor FIFO 132, etc.

In some embodiments, the packet memory 108 is organized as a plurality of buffers having a fixed length that is relatively long as compared to lengths of units of non-packet information that is being communicated from the first component 304 to the second component 308.

The first component 304 includes packing logic 320 that is configured to aggregate multiple units of non-packet information to form a packaged set of non-packet information. The packaged set of non-packet information from the first component 304 is then stored within a buffer corresponding to a queue 160 within the packet memory 108.

Subsequently, the packaged set of non-packet information within the queue 160 is retrieved and provided to the second component 308. The second component 308 includes unpacking logic 324 that is configured to unpack the multiple individual units of non-packet information within the packaged set of non-packet information, and the second component 308 can then use the individual units of non-packet information.

Referring again to FIGS. 1 and 2, in some embodiments communicating non-packet information via the packet memory 108 provides "best effort" communication, i.e., delivery to the intended destination is not guaranteed. For example, in some embodiments, writing non-packet information to a queue 160 includes sending a request to the memory management controller 120 for writing the non-packet information to the queue 160. In such embodiments, if the memory management controller 120 is unable to allocate memory resources for writing the non-packet information to the queue 160 (e.g., the memory management controller 120 and/or the packet memory 108 are too busy handling writing and/or reading packet data to/from the packet memory 108, the packet memory 108 does not have unused memory resources that are available for use in queues 160, etc.), writing the non-packet information to the queue 160 fails. On the other hand, if the memory management controller 120 is able to allocate the memory resources for writing the non-packet information to the queue 160, the memory resources are allocated to the queue 160 and writing the non-packet information to the queue 160 proceeds. In some embodiments, the memory management controller 120 is configured to prioritize packet data over non-packet data, and the memory management controller 120 allocates memory resources to non-packet data only when memory access bandwidth is available.

As an illustrative example, in some embodiments in which the packet memory 108 is organized as a plurality of buffers and each queue 160 comprises a linked list of buffers, writing non-packet information to a queue 160 involves the memory management controller 120 allocating a new buffer to the queue 160. In such embodiments, if the memory management controller 120 is too busy handling the writing and/or reading packet data to/from the packet memory 108 to allocate a new buffer to the queue 160, and/or if the packet memory 108 does not have unused memory resources that are available for use in queues 160, writing the non-packet information to the queue 160 fails. In some embodiments, if the packet memory 108 is too busy with writing and/or reading packet data to/from the packet memory 108, writing the non-packet information to the queue 160 fails. On the other hand, if the memory management controller 120 is able to allocate a new buffer to the queue 160 and the packet memory 108 has bandwidth to handle the writing of non-packet information, the buffer is allocated to the queue 160 and writing the non-packet information to the queue 160 proceeds.

In some embodiments in which communicating information via the packet memory 108 provides "best effort" communication and is not reliable, non-packet information that requires reliable communication is communicated via a reliable interconnection network distinct from the packet memory 108. In other embodiments, a network device includes control logic that enables reliable communication via the packet memory 108.

Figure 4:
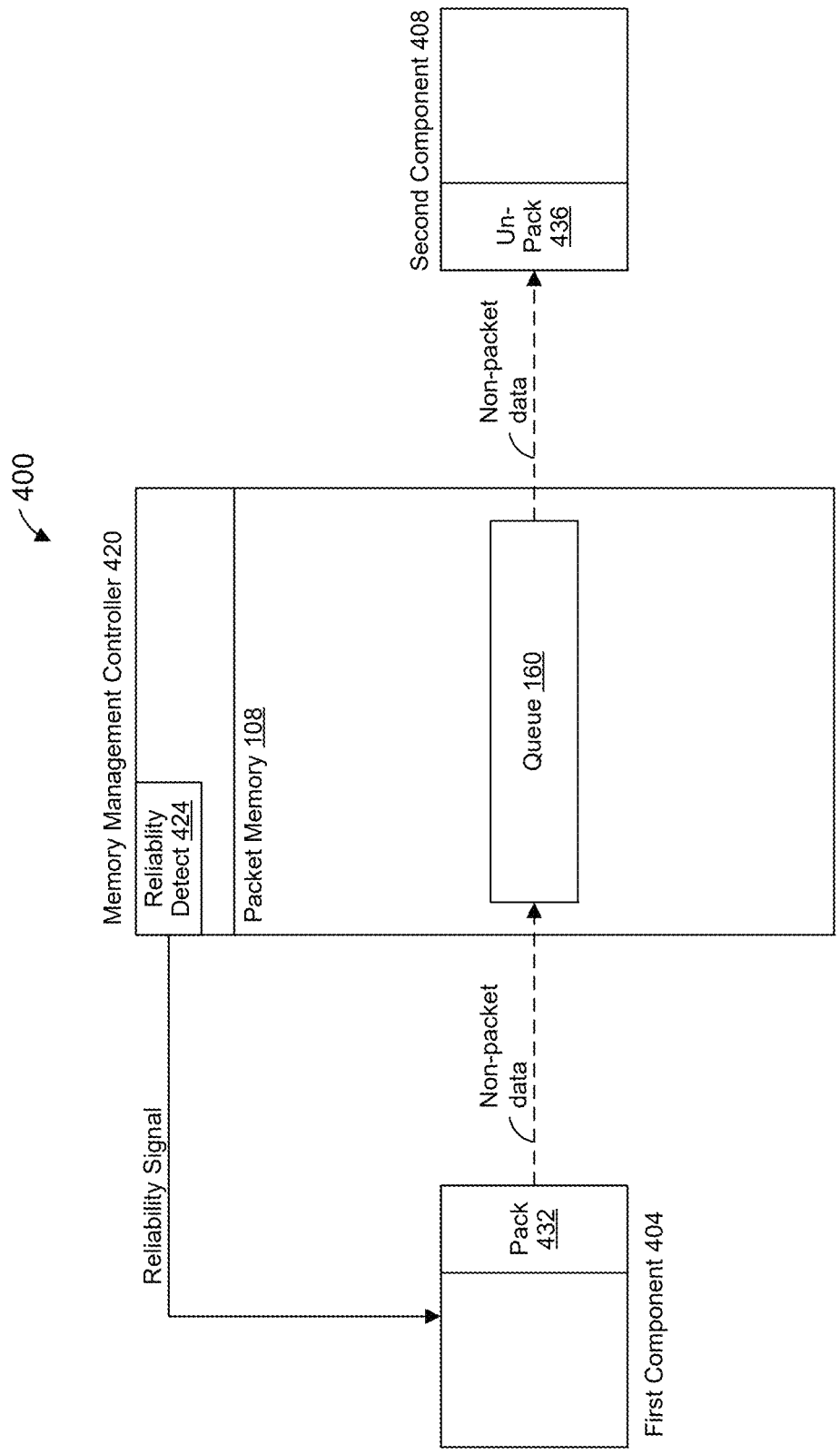
FIG. 4 is a simplified diagram of another example system within a network device for communicating non-packet information via a packet memory of the network device, according to another embodiment.

FIG. 4 is a simplified diagram of another example system 400 within a network device for communicating non-packet information via a packet memory of the network device, according to another embodiment. In an embodiment, the system 400 is included within the network device 100 of FIG. 1 and is described with reference to FIG. 1 for explanatory purposes. In other embodiments, the system 400 is included within a suitable network device 100 different than the network device 100 of FIG. 1. Other components of the network device are omitted from FIG. 4 merely to avoid obscuring relevant components of the network device described below. For example, the crossbar(s) 124 are not shown in FIG. 4.

The system 400 includes a first component 404 of the network device that transfers non-packet information of the network device to a second component 408 of the network device via a queue 160 included within the packet memory 108 of the network device. In some embodiments, the first component 404 accesses the packet memory 108 via a first crossbar 124 (not shown) and the second component 408 accesses the packet memory 108 via a second crossbar 124 (not shown). In other embodiments, the first component 404 and the second component 408 both access the packet memory 108 via a same crossbar 124 (not shown).

In some embodiments, the first component 404 is the CPU 148, and the second component 408 is another component of the network device 100, such as a descriptor FIFO 132, configuration logic 136, a port 104, an external CPU coupled to the network device 100, etc. In some embodiments, the second component 408 is the CPU 148, and the first component 404 is another component of the network device 100, such as a descriptor FIFO 132, configuration logic 136, a port 104, an external CPU coupled to the network device 100, etc.

In various embodiments, the non-packet information transferred between the first component 404 and the second component 408 comprises management information, control information, configuration information, non-packet information within packet descriptors, etc.

In some embodiments, the first component 404 is a descriptor FIFO 132, and the second component 408 is another component of the network device 100, such as another descriptor FIFO 132, etc.

In some embodiments, the packet memory 108 is organized as a plurality of buffers. A memory management controller 420 (similar to the memory management controller 120 of FIG. 1) includes reliability detection logic 424 that is configured to determine times at which the packet memory 108 is capable of providing reliable communication via the queues 160 and to generate a reliability signal that indicates when the packet memory 108 is capable of providing reliable communication via the queues 160. The first component 404 receives the reliability signal and uses the reliability signal to determine times at which the packet memory 108 is capable of providing reliable communication via the queues 160. When the first component 404 has non-packet information that is to be communicated to the second component 408 via the queue 160, and when the packet memory 108 is capable of providing reliable communication via the queue 160, the first component 404 stores the non-packet information in the queue 160. Subsequently, the non-packet information within the queue 160 is retrieved and provided to the second component 408.

On the other hand, when the first component 404 has non-packet information that is to be communicated to the second component 408 via the queue 160, but the packet memory 108 is not capable of providing reliable communication via the queue 160, the first component 404 does not store the non-packet information in the queue 160 but rather waits for a time when the packet memory 108 is capable of providing reliable communication.

In some embodiments, the buffers have a fixed length that is relatively long as compared to lengths of units of non-packet information that is being communicated from the first component 404 to the second component 408. In some embodiments, the first component 404 includes packing logic 432 that is configured to aggregate multiple units of non-packet information to form a packaged set of non-packet information.

In some embodiments, when the first component 404 has non-packet information that is to be communicated to the second component 408 via the queue 160, but the packet memory 108 is not capable of providing reliable communication via the queue 160, the first component 404 does not store the non-packet information in the queue 160 but rather the packing logic 432 aggregates the non-packet information with other non-packet information within a packaged set of non-packet information. When the packet memory 108 later becomes capable of providing reliable communication, the first component 404 stores the packaged set of non-packet information in the queue 160.

Subsequently, the packaged set of non-packet information within the queue 160 is retrieved and provided to the second component 408. The second component 408 includes unpacking logic 436 that is configured to unpack the multiple individual units of non-packet information within the packaged set of non-packet information, and the second component 408 can then use the individual units of non-packet information.

In some embodiments, the packing logic 432 and/or the unpacking logic 436 are omitted.

FIG. 5 is a flow diagram of an example method 500 for communicating non-packet information within a network device, according to an embodiment. In various embodiments, the example network device 100 (FIG. 1), the example system 200 of FIG. 2, the example system 300 of FIG. 3, or the example system 400 of FIG. 4, implements the method 500. In other embodiments, the method 400 is implemented by another suitable network device.

At block 504, a network device (e.g., the network device 100 or another suitable network device) forwards packets among a plurality of ports of the network device, the packets having been received via communication links coupled to the plurality of ports and subsequently transmitted by the network device via the plurality of ports. Forwarding packets among the plurality of ports at block 504 comprises storing at least payloads of the packets in a packet memory (e.g., the packet memory 108) coupled to the plurality of ports until the packets are transmitted by the network device via ports of the network device. Storing at least payloads of the packets in the packet memory comprises i) accessing the packet memory via a plurality of crossbars to write the packets to the memory, and ii) accessing the memory via the plurality of crossbars to read the packets from the memory.

At block 508, the network device (e.g., the network device 100 or another suitable network device) communicates non-packet data within the network device. Communicating the non-packet data at block 508 includes i) accessing the packet memory via the plurality of crossbars to write the non-packet data to the packet memory, and ii) accessing the memory via the plurality of crossbars to read the non-packet data from the memory. The non-packet data communicated at block 508 comprises information not included in any header of any packet received by the network device and not included in any header of any packet transmitted by the network device.

In various embodiments, communicating non-packet data at block 508 comprises communicating one of management information, control information, configuration information, non-packet information within packet descriptors, etc.

In various embodiments, communicating non-packet data at block 508 comprises one of i) a first CPU of the network device, ii) configuration logic, iii) a first descriptor FIFO, iv) a port, etc., a communicating non-packet data to one of i) a second CPU of the network device, ii) configuration logic, iii) a second descriptor FIFO, iv) a port, etc.

In an embodiment, the method 500 further comprises: allocating, by a memory management controller, memory resources of the packet memory for storing packet data; and allocating, by the memory management controller, memory resources of the packet memory for storing the non-packet data.

In another embodiment, the method 500 further comprises: for respective pairs of non-port components of the network device, managing, by the memory management controller, respective linked-lists of buffers in the packet memory that are configured to store respective non-packet data being communicated between the respective pairs of non-port components of the network device.

In another embodiment, the method 500 further comprises: generating, by logic circuitry, a signal that indicates when the packet memory is capable of providing reliable communication of non-packet data; when the signal indicates that the packet memory is capable of providing reliable communication of non-packet data, storing, by a first non-port component of the network device, non-packet data to the packet memory; and when the signal indicates that the packet memory is not capable of providing reliable communication of non-packet data, refraining, by the first non-port component, from storing the non-packet data to the packet memory.

In another embodiment, the method 500 further comprises: aggregating, by first logic circuitry of a first non-port component of the network device, multiple units of non-packet information into an aggregated set of non-packet information; storing the aggregated set of non-packet information in the packet memory; and unpacking, by second logic circuitry of a second non-port component of the network device, multiple units of non-packet information from the aggregated set of non-packet information that was retrieved from the packet memory.

Embodiment 1: A network device, comprising: a plurality of ports configured to communicatively couple to a plurality of communication links; a packet processor configured to process at least headers of packets received via ports of the network device to make forwarding decisions regarding the packets; a packet memory coupled to the plurality of ports, the packet memory configured to store at least payloads of packets received via ports of the network device until the packets are transmitted by the network device via ports of the network device; a plurality of crossbars coupled to the packet memory, each crossbar configured to provide to a respective set of ports of the network device read access and write access to the packet memory; and a plurality of non-port components associated with processing packets received by the network device, the plurality of non-port components coupled to the plurality of crossbars, each non-port component being configured to send non-packet data to one or more of i) at least one port and ii) at least one other non-port component, by storing non-packet data in the packet memory for retrieval by the one or more of i) the at least one port and ii) the at least one other non-port component, the non-packet data comprising information not included in any packet i) received or transmitted by the network device and ii) for which the packet processor makes a forwarding decision.

Embodiment 2: The network device of embodiment 1, wherein the plurality of non-port components comprises: a processor configured to send configuration information to one or more of i) at least one port and ii) at least one other non-port component by accessing the packet memory via one of the crossbars to store the configuration information in the packet memory for retrieval by the one or more of i) the at least one port and ii) the at least one other non-port component, the configuration information including information that i) controls operation of the one or more of a) the at least one port and b) the at least one other non-port component and ii) is not transmitted by any communication links communicatively coupled to any ports of the network device; wherein the one or more of i) the at least one port and ii) the at least one other non-port component are configured to: i) access the packet memory via at least one of the crossbars to retrieve the configuration information from the packet memory, and ii) operate according to the configuration information.

Embodiment 3: The network device of embodiment 1, wherein the plurality of non-port components comprises: a first packet descriptor first-in-first-out (FIFO) queue; and a second packet descriptor FIFO queue; wherein the first packet descriptor FIFO queue is configured to send packet descriptors to the second packet descriptor FIFO queue by accessing the packet memory via one of the crossbars to store the packet descriptors in the packet memory for retrieval by the second packet descriptor FIFO queue, each packet descriptor comprising information corresponding to a packet, the information corresponding to the packet including information that was not within any headers of the packet when the packet was received by the network device and that is not within any headers of the packet when the packet is transmitted by the network device via one or more communication links among the plurality of communication links.

Embodiment 4: The network device of embodiment 1, wherein the plurality of non-port components comprises: a first non-port component configured to send management information to one or more of i) at least one port and ii) at least one other non-port component by accessing the packet memory via one of the crossbars to store the management information in the packet memory for retrieval by the one or more of i) the at least one port and ii) the at least one other non-port component, the management information comprising information corresponding to management of the network device; wherein the one or more of i) the at least one port and ii) the at least one other non-port component are configured to access the packet memory via at least one of the crossbars to retrieve the management information from the packet memory.

Embodiment 5: The network device of embodiment 1, wherein the plurality of non-port components comprises: a first non-port component configured to send debug information to one or more of i) at least one port and ii) at least one other non-port component by accessing the packet memory via one of the crossbars to store the debug information in the packet memory for retrieval by the one or more of i) the at least one port and ii) the at least one other non-port component, the debug information comprising information corresponding to debugging operation of the network device; wherein the one or more of i) the at least one port and ii) the at least one other non-port component are configured to access the packet memory via at least one of the crossbars to retrieve the debug information from the packet memory.

Embodiment 6: The network device of embodiment 1, further comprising: a memory management controller configured to allocate memory resources of the packet memory for storing packet data and to allocate memory resources of the packet memory for storing the non-packet data.

Embodiment 7: The network device of embodiment 6, wherein the memory management controller is further configured to: for respective pairs of non-port components of the network device, manage respective linked-lists of buffers in the packet memory that are configured to store respective non-packet data being communicated between the respective pairs of non-port components of the network device.

Embodiment 8: The network device of embodiment 1, further comprising: logic circuitry configured to determine when the packet memory is capable of providing reliable communication of non-packet data and to generate a signal that indicates when the packet memory is capable of providing reliable communication of non-packet data; wherein a first non-port component of the network device is configured to: when the signal indicates that the packet memory is capable of providing reliable communication of non-packet data, store non-packet data to the packet memory, and when the signal indicates that the packet memory is not capable of providing reliable communication of non-packet data, refrain from storing the non-packet data to the packet memory.

Embodiment 9: The network device of embodiment 1, wherein: a first non-port component of the network device includes first logic circuitry that is configured to aggregate multiple units of non-packet information into an aggregated set of non-packet information, and store the aggregated set of non-packet information in the packet memory; and a second non-port component of the network device includes second logic circuitry that is configured to unpack multiple units of non-packet information from the aggregated set of non-packet information that was retrieved from the packet memory.

Embodiment 10: The network device of embodiment 1, wherein the non-packet information comprises one or more of: management information that is used by a component of the network device to manage operation of the network device, control information that is configured to control operation of the component, configuration information that is used to configure the component of the network device, an indication of a location in the packet memory at which a packet is stored, an identifier of a port at which the packet was received, an indicator of a time at which the packet was received by the network device, an indicator of one or more ports via which the packet is to be transmitted, an indicator of whether the packet is to be dropped, an indicator of whether a tunneling header is to be added to the packet, an indicator of whether a tunneling header is to be removed from the packet, an indicator of whether a timestamp is to be added to the packet prior to transmitting the packet.

Embodiment 11: A method for communicating information within a network device, the method comprising: forwarding packets among a plurality of ports of the network device based on forwarding decisions made by a packet processor of the network device, the packets having been received via communication links coupled to the plurality of ports and subsequently transmitted by the network device via the plurality of ports, wherein forwarding the packets among the plurality of ports comprises storing at least payloads of the packets in a packet memory coupled to the plurality of ports until the packets are transmitted by the network device via ports of the network device, including i) accessing the packet memory via a plurality of crossbars coupled to the packet memory to write the packets to the packet memory, and ii) accessing the packet memory via the plurality of crossbars to read the packets from the packet memory; and communicating non-packet data within the network device, including i) accessing the packet memory via the plurality of crossbars to write the non-packet data to the packet memory, and ii) accessing the packet memory via the plurality of crossbars to read the non-packet data from the packet memory, the non-packet data comprising information not included in any packets i) received or transmitted by the network device and ii) for which the packet processor makes a forwarding decision.

Embodiment 12: The method of embodiment 11, wherein communicating non-packet data within the network device comprises: accessing, by a processor of the network device, the packet memory via the plurality of crossbars to write configuration information to the packet memory, the configuration information including information that i) controls operation of one or more of a) at least one port and b) at least one other non-port component of the network device, and ii) is not transmitted by any communication links communicatively coupled to any ports of the network device; and accessing, by the one or more of i) the at least one port and ii) the at least one other non-port component of the network device, the packet memory via the plurality of crossbars to retrieve the configuration information from the packet memory; wherein the method further comprises, after retrieving the configuration information from the packet memory, the one or more of i) the at least one port and ii) the at least one other non-port component operating according to the configuration information.

Embodiment 13: The method of embodiment 11, wherein communicating non-packet data within the network device comprises: accessing, by a first packet descriptor first-in-first-out (FIFO) queue of the network device, the packet memory via the plurality of crossbars to write packet descriptors to the packet memory, each packet descriptor comprising information corresponding to a packet, the information corresponding to the packet including information that was not within any headers of the packet when the packet was received by the network device and that is not within any headers of the packet when the packet is transmitted by the network device via one or more communication links among the plurality of communication links; and accessing, by a second packet descriptor FIFO queue of the network device, the packet memory via the plurality of crossbars to retrieve the packet descriptors from the packet memory.

Embodiment 14: The method of embodiment 11, wherein communicating non-packet data within the network device comprises: accessing, by a first non-port component of the network device, the packet memory via the plurality of crossbars to write management information to the packet memory, the management information comprising information corresponding to management of the network device; and accessing, by one or more of i) at least one port and ii) at least one other non-port component of the network device, the packet memory via the plurality of crossbars to retrieve the management information from the packet memory.

Embodiment 15: The method of embodiment 11, wherein communicating non-packet data within the network device comprises: accessing, by a first non-port component of the network device, the packet memory via the plurality of crossbars to write debug information to the packet memory, the debug information comprising information corresponding to debugging operation of the network device; and accessing, by one or more of i) at least one port and ii) at least one other non-port component of the network device, the packet memory via the plurality of crossbars to retrieve the debug information from the packet memory.

Embodiment 16: The method of embodiment 11, further comprising: allocating, by a memory management controller, memory resources of the packet memory for storing packet data; and allocating, by the memory management controller, memory resources of the packet memory for storing the non-packet data.

Embodiment 17: The method of embodiment 16, further comprising: for respective pairs of non-port components of the network device, managing, by the memory management controller, respective linked-lists of buffers in the packet memory that are configured to store respective non-packet data being communicated between the respective pairs of non-port components of the network device.

Embodiment 18: The method of embodiment 11, further comprising: generating, by logic circuitry, a signal that indicates when the packet memory is capable of providing reliable communication of non-packet data; when the signal indicates that the packet memory is capable of providing reliable communication of non-packet data, storing, by a first non-port component of the network device, non-packet data to the packet memory; and when the signal indicates that the packet memory is not capable of providing reliable communication of non-packet data, refraining, by the first non-port component, from storing the non-packet data to the packet memory.

Embodiment 19: The method of embodiment 11, further comprising: aggregating, by first logic circuitry of a first non-port component of the network device, multiple units of non-packet information into an aggregated set of non-packet information; storing the aggregated set of non-packet information in the packet memory; and unpacking, by second logic circuitry of a second non-port component of the network device, multiple units of non-packet information from the aggregated set of non-packet information that was retrieved from the packet memory.

Embodiment 20: The embodiment of embodiment 11, wherein the non-packet information comprises one or more of: management information that is used by a component of the network device to manage operation of the network device, control information that is configured to control operation of the component, configuration information that is used to configure the component of the network device, an indication of a location in the packet memory at which a packet is stored, an identifier of a port at which the packet was received, an indicator of a time at which the packet was received by the network device, an indicator of one or more ports via which the packet is to be transmitted, an indicator of whether the packet is to be dropped, an indicator of whether a tunneling header is to be added to the packet, an indicator of whether a tunneling header is to be removed from the packet, an indicator of whether a timestamp is to be added to the packet prior to transmitting the packet.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random-access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:
1. A network device, comprising:
a plurality of ports configured to be communicatively coupled to a plurality of communication links;
a packet processor configured to process at least headers of packets received via the ports of the network device to make forwarding decisions regarding the packets;
a packet memory coupled to the plurality of ports, the packet memory configured to store at least payloads of the packets received via the ports of the network device until the packets are transmitted by the network device via the ports of the network device;
a plurality of crossbars coupled to the packet memory, each crossbar configured to provide a respective set of ports of the network device with read access and write access to the packet memory; and
a plurality of non-port components associated with processing the packets received by the network device, the plurality of non-port components coupled to the plurality of crossbars, each one or more of the non-port components being configured to
determine when the packet memory is capable of providing reliable communication of the non-packet data, and
in response to determining that the packet memory is capable of providing the reliable communication of the non-packet data, send the non-packet data to one or more of i) at least one port and ii) at least one other non-port component, by storing the non-packet data in the packet memory for retrieval by the one or more of i) the at least one port and ii) the at least one other non-port component, the non-packet data comprising information not included in any packet i) received or transmitted by the network device and ii) for which the packet processor makes the forwarding decisions.

2. The network device of claim 1, wherein the plurality of non-port components comprises:

a processor configured to send configuration information to the one or more of i) the at least one port and ii) the at least one other non-port component by accessing the packet memory via one of the crossbars to store the configuration information in the packet memory for retrieval by the one or more of i) the at least one port and ii) the at least one other non-port component, the configuration information including information that i) controls operation of the one or more of a) the at least one port and b) the at least one other non-port component and ii) is not transmitted by any communication links communicatively coupled to any ports of the network device; and wherein the one or more of i) the at least one port and ii) the at least one other non-port component are configured to: i) access the packet memory via at least one of the crossbars to retrieve the configuration information from the packet memory, and ii) operate according to the configuration information.

3. The network device of claim 1, wherein the plurality of non-port components comprises:

a first packet descriptor first-in-first-out (FIFO) queue; and a second packet descriptor FIFO queue;

wherein the first packet descriptor FIFO queue is configured to send packet descriptors to the second packet descriptor FIFO queue by accessing the packet memory via one of the crossbars to store the packet descriptors in the packet memory for retrieval by the second packet descriptor FIFO queue, each packet descriptor comprising information corresponding to a packet of the packets received via the ports, the information in each packet descriptor corresponding to the packet including information that was not within any headers of the packet when the packet was received by the network device and that is not within any headers of the packet when the packet is transmitted by the network device via one or more communication links among the plurality of communication links.

4. The network device of claim 1, wherein the plurality of non-port components comprises:

a first non-port component configured to send management information to the one or more of i) the at least one port and ii) the at least one other non-port component by accessing the packet memory via one of the crossbars to store the management information in the packet memory for retrieval by the one or more of i) the at least one port and ii) the at least one other non-port component, the management information comprising information corresponding to management of the network device; and wherein the one or more of i) the at least one port and ii) the at least one other non-port component are configured to access the packet memory via at least one of the crossbars to retrieve the management information from the packet memory.

5. The network device of claim 1, wherein the plurality of non-port components comprises:

a first non-port component configured to send debug information to the one or more of i) the at least one port and ii) the at least one other non-port component by accessing the packet memory via one of the crossbars to store the debug information in the packet memory for retrieval by the one or more of i) the at least one port and ii) the at least one other non-port component, the debug information comprising information corresponding to debugging operation of the network device; and wherein the one or more of i) the at least one port and ii) the at least one other non-port component are configured to access the packet memory via at least one of the crossbars to retrieve the debug information from the packet memory.

6. The network device of claim 1, further comprising:

a memory management controller configured to allocate memory resources of the packet memory for storing packet data and to allocate memory resources of the packet memory for storing the non-packet data.

7. The network device of claim 6, wherein the memory management controller is further configured to:

for respective pairs of non-port components of the network device, manage respective linked-lists of buffers in the packet memory that are configured to store respective non-packet data being communicated between the respective pairs of non-port components of the network device.

8. The network device of claim 1, further comprising:

logic circuitry configured to determine when the packet is capable of providing the reliable communication of the non-packet data and to generate a signal that indicates when the packet memory is capable of providing the reliable communication of the non-packet data; and wherein a first non-port component of the network device is configured to:

when the signal indicates that the packet memory is capable of providing the reliable communication of the non-packet data, store the non-packet data to the packet memory, and when the signal indicates that the packet memory is not capable of providing the reliable communication of the non-packet data, refrain from storing the non-packet data to the packet memory.

9. The network device of claim 1, wherein:

a first non-port component of the network device includes first logic circuitry that is configured to aggregate multiple units of non-packet information into an aggregated set of non-packet information, and store the aggregated set of non-packet information in the packet memory; and a second non-port component of the network device includes second logic circuitry that is configured to unpack the multiple units of non-packet information from the aggregated set of non-packet information that was retrieved from the packet memory.

10. The network device of claim 1, wherein the non-packet information comprises one or more of:

management information that is used by a component of the network device to manage operation of the network device, control information that is configured to control operation of the component, configuration information that is used to configure the component of the network device, an indication of a location in the packet memory at which a packet is stored, an identifier of a port at which the packet was received, an indicator of a time at which the packet was received by the network device, an indicator of one or more ports via which the packet is to be transmitted, an indicator of whether the packet is to be dropped, an indicator of whether a tunneling header is to be added to the packet, an indicator of whether a tunneling header is to be removed from the packet, and an indicator of whether a timestamp is to be added to the packet prior to transmitting the packet.

11. A method for communicating information within a network device, the method comprising:

forwarding packets among a plurality of ports of the network device based on forwarding decisions made by a packet processor of the network device, the packets having been received via communication links coupled to the plurality of ports and subsequently transmitted by the network device via the plurality of ports, wherein forwarding the packets among the plurality of ports comprises storing at least payloads of the packets in a packet memory coupled to the plurality of ports until the packets are transmitted by the network device via the ports of the network device, including i) accessing the packet memory via a plurality of crossbars coupled to the packet memory to write the packets to the packet memory, and ii) accessing the packet memory via the plurality of crossbars to read the packets from the packet memory; and communicating non-packet data within the network device, including
- i) determining when the packet memory is capable of providing reliable communication of the non-packet data,
- in response to determining that the packet memory is capable of providing the reliable communication of the non-packet data, accessing the packet memory via the plurality of crossbars to write the non-packet data to the packet memory, and
- iii) accessing the packet memory via the plurality of crossbars to read the non-packet data from the packet memory, the non-packet data comprising information not included in any packets i) received or transmitted by the network device and ii) for which the packet processor makes the forwarding decisions.

12. The method of claim 11, wherein communicating non-packet data within the network device comprises:
    accessing, by a processor of the network device, the packet memory via the plurality of crossbars to write configuration information to the packet memory, the configuration information including information that i) controls operation of one or more of a) at least one port and b) at least one other non-port component of the network device, and ii) is not transmitted by any communication links communicatively coupled to any ports of the network device; and
    accessing, by the one or more of i) the at least one port and ii) the at least one other non-port component of the network device, the packet memory via the plurality of crossbars to retrieve the configuration information from the packet memory; and
    wherein the method further comprises, after retrieving the configuration information from the packet memory, the one or more of i) the at least one port and ii) the at least one other non-port component operating according to the configuration information.

13. The method of claim 11, wherein communicating non-packet data within the network device comprises:
    accessing, by a first packet descriptor first-in-first-out (FIFO) queue of the network device, the packet memory via the plurality of crossbars to write packet descriptors to the packet memory, each packet descriptor comprising information corresponding to a packet of the packets received via the ports, the information in each packet descriptor corresponding to the packet including information that was not within any headers of the packet when the packet was received by the network device and that is not within any headers of the packet when the packet is transmitted by the network device via one or more communication links among the plurality of communication links; and
    accessing, by a second packet descriptor FIFO queue of the network device, the packet memory via the plurality of crossbars to retrieve the packet descriptors from the packet memory.

14. The method of claim 11, wherein communicating non-packet data within the network device comprises:
    accessing, by a first non-port component of the network device, the packet memory via the plurality of crossbars to write management information to the packet memory, the management information comprising information corresponding to management of the network device; and
    accessing, by one or more of i) the at least one port and ii) the at least one other non-port component of the network device, the packet memory via the plurality of crossbars to retrieve the management information from the packet memory.

15. The method of claim 11, wherein communicating non-packet data within the network device comprises:
    accessing, by a first non-port component of the network device, the packet memory via the plurality of crossbars to write debug information to the packet memory, the debug information comprising information corresponding to debugging operation of the network device; and
    accessing, by one or more of i) the at least one port and ii) the at least one other non-port component of the network device, the packet memory via the plurality of crossbars to retrieve the debug information from the packet memory.

16. The method of claim 11, further comprising:
    allocating, by a memory management controller, memory resources of the packet memory for storing packet data; and
    allocating, by the memory management controller, memory resources of the packet memory for storing the non-packet data.

17. The method of claim 16, further comprising:
    for respective pairs of non-port components of the network device, managing, by the memory management controller, respective linked-lists of buffers in the packet memory that are configured to store respective non-packet data being communicated between the respective pairs of non-port components of the network device.

18. The method of claim 11, further comprising:
    generating, by logic circuitry, a signal that indicates when the packet memory is capable of providing reliable communication of the non-packet data;
    when the signal indicates that the packet memory is capable of providing the reliable communication of the non-packet data, storing, by a first non-port component of the network device, the non-packet data to the packet memory; and
    when the signal indicates that the packet memory is not capable of providing the reliable communication of the non-packet data, refraining, by the first non-port component, from storing the non-packet data to the packet memory.

19. The method of claim 11, further comprising:
    aggregating, by first logic circuitry of a first non-port component of the network device, multiple units of non-packet information into an aggregated set of non-packet information;

storing the aggregated set of non-packet information in the packet memory; and unpacking, by second logic circuitry of a second non-port component of the network device, the multiple units of non-packet information from the aggregated set of non-packet information that was retrieved from the packet memory.

20. The method of claim 11, wherein the non-packet information comprises one or more of:

management information that is used by a component of the network device to manage operation of the network device, control information that is configured to control operation of the component, configuration information that is used to configure the component of the network device, an indication of a location in the packet memory at which a packet is stored, an identifier of a port at which the packet was received, an indicator of a time at which the packet was received by the network device, an indicator of one or more ports via which the packet is to be transmitted, an indicator of whether the packet is to be dropped, an indicator of whether a tunneling header is to be added to the packet, an indicator of whether a tunneling header is to be removed from the packet, and an indicator of whether a timestamp is to be added to the packet prior to transmitting the packet.

* * * * *